US010677485B2

(12) United States Patent
Poluri et al.

(10) Patent No.: US 10,677,485 B2
(45) Date of Patent: Jun. 9, 2020

(54) DETERMINING THE CAUSE OF A FAULT IN AN HVAC SYSTEM

(71) Applicant: Honeywell International Inc., Morris Plains, NJ (US)

(72) Inventors: Nagasree Poluri, Bangalore (IN); Seema P, Bokaro Steel (IN); Deenadayalan Karunakaran, Bangalore (IN); Evan John Kingston, Brisbane (AU); Manish Gupta, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 119 days.

(21) Appl. No.: 15/709,002

(22) Filed: Sep. 19, 2017

(65) Prior Publication Data

US 2019/0086107 A1    Mar. 21, 2019

(51) Int. Cl.
*F24F 11/00*    (2018.01)
*G05B 23/02*    (2006.01)
(Continued)

(52) U.S. Cl.
CPC .............. *F24F 11/30* (2018.01); *F24F 11/32* (2018.01); *F24F 11/62* (2018.01); *G05B 23/0221* (2013.01); *G05B 23/0289* (2013.01); *F24F 11/54* (2018.01); *F24F 11/58* (2018.01); *F24F 11/59* (2018.01); *F24F 11/63* (2018.01); *F24F 11/64* (2018.01); *G05B 2219/2614* (2013.01)

(58) Field of Classification Search
CPC ............ G05B 15/02; G05B 2219/2642; G05B 17/02; G05B 2219/2614; G05B 23/0243; G05B 23/0291; G06F 11/079; G06F 17/5004; F24F 11/30; F24F 11/63
See application file for complete search history.

(56) References Cited

U.S. PATENT DOCUMENTS 6,223,544 B1 *  5/2001  Seem ..................... F24F 11/30
                                                            62/127
8,731,724 B2    5/2014  Drees et al.
(Continued)

FOREIGN PATENT DOCUMENTS

MX    2012004529 A    6/2012

OTHER PUBLICATIONS

Najafi, "Fault Detection and Diagnosis in Building HVAC Systems", UC Berkeley: Mechanical Engineering, http://escholarship.org/uc/item/6w02z2hm#, 2010, 79 pages.

*Primary Examiner* — Chun Cao
(74) *Attorney, Agent, or Firm* — Seager Tufte & Wickhem LLP

(57) ABSTRACT

Devices, methods, and systems for determining the cause of a fault in a heating, ventilation, and air conditioning (HVAC) system are described herein. One device includes a memory, and a processor configured to execute executable instructions stored in the memory to receive operational data associated with an HVAC system, receive control logic associated with a controller of the HVAC system, determine a cause of a fault occurring in the HVAC system based, at least in part, on the operational data associated with the HVAC system and the control logic of the controller of the HVAC system, and provide the cause of the fault occurring in the HVAC system to a user.

19 Claims, 4 Drawing Sheets

(51) Int. Cl.

*F24F 11/30* (2018.01)
*F24F 11/32* (2018.01)
*F24F 11/62* (2018.01)
*F24F 11/54* (2018.01)
*F24F 11/63* (2018.01)
*F24F 11/58* (2018.01)
*F24F 11/59* (2018.01)
*F24F 11/64* (2018.01)

(56) References Cited

U.S. PATENT DOCUMENTS

| | | | |
|---|---|---|---|
| 10,215,438 B2* | 2/2019 | Dempsey | F24F 11/30 |
| 2008/0059833 A1 | 3/2008 | Harrod | |
| 2011/0047418 A1* | 2/2011 | Drees | G05B 15/02 |
| | | | 714/57 |
| 2011/0093424 A1 | 4/2011 | Zimmermann et al. | |
| 2013/0158723 A1* | 6/2013 | Erickson | F24F 11/30 |
| | | | 700/278 |
| 2013/0197698 A1* | 8/2013 | Shah | F24F 11/30 |
| | | | 700/276 |
| 2013/0204440 A1* | 8/2013 | Fadell | F24F 11/30 |
| | | | 700/276 |
| 2015/0378373 A1* | 12/2015 | Sprinkle | G05D 23/1917 |
| | | | 700/276 |
| 2016/0215996 A1* | 7/2016 | Blair | G08B 21/187 |
| 2017/0138629 A1* | 5/2017 | Fadell | F24F 11/30 |
| 2017/0314797 A1* | 11/2017 | Blair | F24F 11/30 |
| 2019/0041882 A1* | 2/2019 | Noboa | F24F 11/30 |

* cited by examiner

*Fig. 3C*
*Fig. 3B*
*Fig. 3A*

DETERMINING THE CAUSE OF A FAULT IN AN HVAC SYSTEM

TECHNICAL FIELD

The present disclosure relates generally to devices, methods, and systems for determining the cause of a fault in an HVAC system.

BACKGROUND

A heating, ventilation, and air conditioning (HVAC) system can be used to control the environment within a facility (e.g., building). For example, an HVAC system can include a number of components (e.g., equipment, sensors, operating panels, controllers, actuators, etc.) that can be used to control the air temperature of different zones (e.g., rooms, areas, spaces, and/or floors) of a facility, in order to keep the zones in a comfort state for their occupants.

During operation of an HVAC system, however, faults in the HVAC system (e.g., in different components of the HVAC system) may sometimes occur. Detecting and correcting faults in the HVAC system can be important to provide a comfortable environment for the occupants of the facility, to prevent the fault from causing further damage to the HVAC system, and/or to avoid inefficient operation of the HVAC system which may result in higher energy consumption, for example.

In order to effectively correct a fault in an HVAC system, the cause of the fault must first be determined. However, determining the cause of a fault occurring in an HVAC system, and then correcting the fault, can be a difficult, costly, and/or time consuming process. For instance, in some previous approaches, a technician may have to travel to (e.g., be physically present at) the facility in order to determine the cause of a fault and correct the fault. Further, because of the complexity of HVAC systems, in some instances the cause of the fault may be at a different location in the facility than where the fault appears to be occurring (e.g., at a different location than where the effects of the fault may be being felt).

BRIEF DESCRIPTION OF THE DRAWINGS

FIGS. 3A-3C illustrate example screen shots displayed during a determination of a cause of a fault in an HVAC system in accordance with an embodiment of the present disclosure.

DETAILED DESCRIPTION

Figure 1:
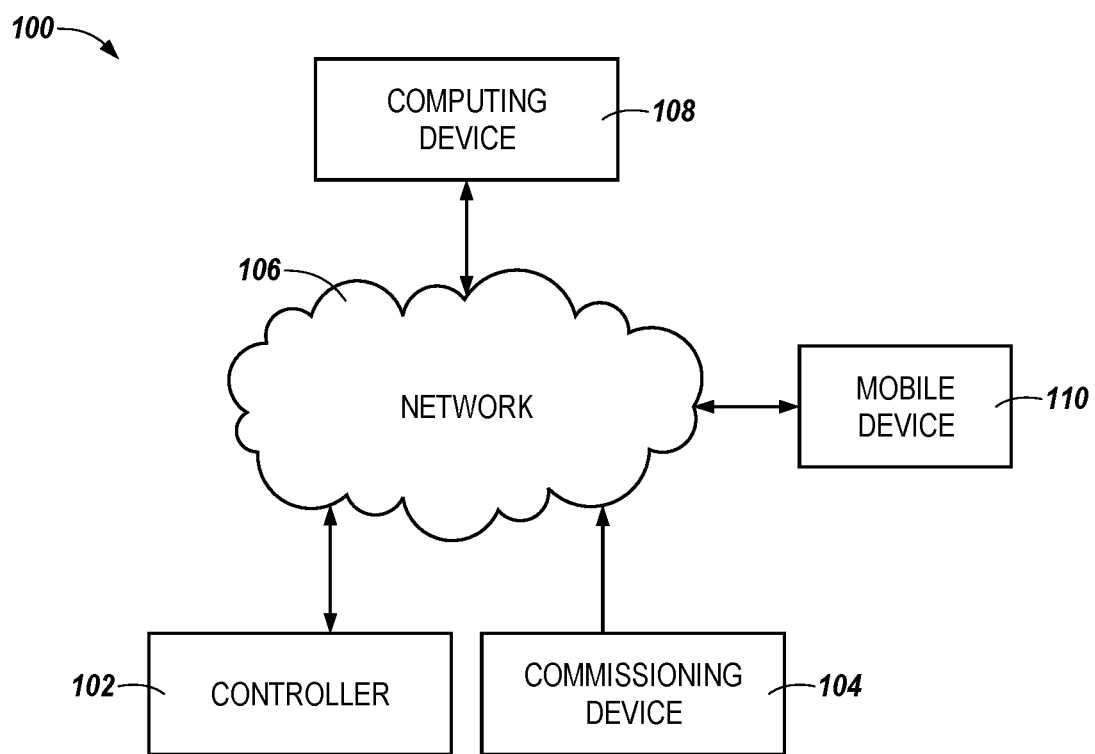
FIG. 1 illustrates an example of a system for determining the cause of a fault in an HVAC system in accordance with an embodiment of the present disclosure.

Devices, methods, and systems for determining the cause of a fault in a heating, ventilation, and air conditioning (HVAC) system are described herein. For example, an embodiment includes a memory, and a processor configured to execute executable instructions stored in the memory to receive operational data associated with an HVAC system, receive control logic associated with a controller of the HVAC system, determine a cause of a fault occurring in the HVAC system based, at least in part, on the operational data associated with the HVAC system and the control logic of the controller of the HVAC system, and provide the cause of the fault occurring in the HVAC system to a user.

Embodiments of the present disclosure can be used to determine the cause (e.g., the root cause) of a fault occurring in an HVAC system, and correct the fault, in an easier, cheaper, and/or less time consuming manner than previous approaches. For example, in embodiments of the present disclosure, a technician may not have to travel to (e.g., may not have to be physically present at) a facility in order to determine the cause of a fault occurring in an HVAC system of the facility and/or correct the fault. Rather, embodiments of the present disclosure can allow the technician to determine the cause of the fault, and/or correct the fault, remotely.

As an additional example, embodiments of the present disclosure can be used to automatically (e.g., without user input or intervention) determine the cause of a fault and/or correct the fault, which may reduce or eliminate the need for a technician to do so. Further, embodiments of the present disclosure can quickly and effectively determine the cause of a fault occurring in an HVAC system even when the cause of the fault is at a different location in the facility than where the fault appears to be occurring (e.g., at a different location than where the effects of the fault may be being felt).

As an additional example, embodiments of the present disclosure can be used to provide a recommendation (e.g., to the technician) on how to correct a fault occurring in an HVAC system in the most optimized (e.g., cheapest and/or quickest) way possible. Further, embodiments of the present disclosure may be used to predict faults that may occur in the future, so that they may be corrected (e.g., prevented) before they actually occur. Further, embodiments of the present disclosure may reduce and/or eliminate false alarms, thereby allowing the technician to avoid wasting time on false alarms.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 408 in FIG. 4.

As used herein, "a" or "a number of" something can refer to one or more such things, while "a plurality of" something can refer to more than one such things. For example, "a number of faults" can refer to one or more faults, while "a plurality of faults" can refer to more than one fault.

FIG. 1 illustrates an example of a system 100 for determining the cause of a fault in an HVAC system in accordance with an embodiment of the present disclosure. The HVAC system can be, for example, the HVAC system of a facility (e.g., building), such as, for instance, a commercial office building. However, embodiments of the present disclosure are not limited to a particular type of facility.

The HVAC system can be used to control the environment within the facility. For example, the HVAC system can include a number of components that can be used to control the air temperature of different zones (e.g., rooms, areas, spaces, and/or floors) of a facility, in order to keep the zones in a comfort state for their occupants. The components of the HVAC system can include, for example, objects, control components (e.g., controllers), equipment, devices, networks, sensors, and/or actuators such as, for instance, valves such as heating and/or cooling valves, chillers (e.g., chiller plant), boilers (e.g., boiler plant), pumps such as hot water and/or chilled water pumps, fans, compressors, air dampers such as variable air volume (VAV) dampers, air handling units (AHUs) (e.g., AHU plant), coils such as heating and/or cooling coils, air filters, and/or cooling towers, among other components. The HVAC system may also include connections (e.g., physical connections) between the components, such as a chain of equipment (e.g., duct work, pipes, ventilation, and/or electrical and/or gas distribution equipment) that connects the components, among other connections.

Further, the HVAC system can include (e.g., be divided into) a number of zones. The zones of the HVAC system can correspond to the zones of the facility, for example.

As shown in FIG. 1, system 100 can include a controller 102. Controller 102 can be, for example, a controller of the HVAC system of the facility. For example, controller 102 can be used to check and/or set the state of the components, component connections, and/or zones of the HVAC system. Although one controller is illustrated in FIG. 1, embodiments of the present disclosure are not so limited (e.g., system 100 and/or the HVAC system can include a number of controllers analogous to controller 102).

Controller 102 can collect data, such as, for instance, real-time operational data, associated with the HVAC system. For example, controller 102 can receive the data from the components of the HVAC system. Such data can include, for instance, current quantities, statuses, and/or properties of the components, component connections, and/or zones of the HVAC system.

As shown in FIG. 1, system 100 can include a computing device 108. Computing device 108 can be part of a centralized analytics service (e.g., servers and/or databases) that is located remotely from the HVAC system and/or controller 102, and will be further described herein (e.g., in connection with FIG. 4).

As shown in FIG. 1, controller 102 can send (e.g., push) the collected data to computing device 108 via network 106 (e.g., computing device 108 can receive the data from controller 102 via network 106). Network 114 can be a wired or wireless network. For example, network 106 can be a network relationship through which computing device 108 and controller 102 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive the data collected by controller 102, and transmit the received data to computing device 108 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, system 100 can include a commissioning device 104. Commissioning device 104 can be, for example, an engineering tool used (e.g., by an engineer) during commissioning of (e.g., to install and/or configure) the HVAC system. For instance, commissioning device 104 may be used to configure control logic associated with (e.g., for) controller 102, such as control logic associated with the input points (e.g., input variables) and output points (e.g., output variables) of controller 102.

For example, the control logic associated with controller 102 can include a logical mapping between the input points of controller 102 and each respective output point of controller 102. This logical mapping can provide an indication of (e.g., identify) which input point or points of controller 102 affect each respective output point of controller 102. As used herein, an input point affects an output point if an adjustment (e.g., change) made to that input point (e.g., to the value of that input point) may result, either directly or indirectly, in a change to that output point (e.g. to the value of that output point). For instance, an input point indirectly affects an output point if the adjustment to that input point results in a change to an intervening input and/or output point(s), which then results in a change to that output point, and an input point directly affects an output point if the adjustment to that input point results in a change to that output point without a change to any intervening input or output points. Further, some input points may affect one (e.g. a single) output point, and some input points may affect more than one (e.g., multiple) output points. The value for an input or output point can be, or correspond to, for instance, a numerical value, a mode, a position, or an alarm, among other values.

As an example, an output point of controller 102 may be the point of a particular VAV damper of the HVAC system that is controlled by controller 102, and the value of that output point corresponds to whether that VAV damper is in a closed or open position. The input points of controller 102 that affect that output point (e.g., that affect whether the VAV damper is closed or open) can include the occupancy mode point for the zone of the HVAC system in which that VAV damper is located, the control mode point for the zone of the HVAC system in which that VAV damper is located, the point (e.g. position) of the supply air damper for that VAV damper, and the point (e.g. status) of the AHU fan for that VAV damper.

Further, the control logic associated with controller 102 may also be inter-connected across the other controllers of the HVAC system. For example, the input points of controller 102 may include an input point that is shared with an additional controller of the HVAC system, and/or the output points of controller 102 may include an output point that is shared with an additional controller, which may or may not be the same controller(s) with which the input point is shared. In such an example, the logical mapping between the input and output points of controller 102 can include a logical mapping for these shared input and/or output points. An example of such a logical mapping will be further described herein (e.g., in connection with FIG. 2).

In an embodiment, commissioning device 104 can send (e.g., push) the control logic associated with controller 102 (e.g., the logical mapping between the input points and output points of the controller) to computing device 108 via network 106 (e.g., computing device 108 can receive the control logic from commissioning device 104 via network 106), as illustrated in FIG. 1. Commissioning device 104 may also send additional project information associated with the commissioning of the HVAC system, such as, for instance, controller information, plant information, point information (e.g., point sharing and/or point role information), control strategy information, equipment information, air/water supply relationship information, and/or facility information, to computing device 108 via network 106. In an embodiment, the control logic associated with controller 102, and/or the additional project information associated with the commissioning of the HVAC system, may be sent to computing device 108 (via network 106) from controller 102 (e.g., instead of from commissioning device 104).

Computing device 108 can determine a cause of a fault occurring in the HVAC system based, at least in part, on the data collected by controller 102 (e.g., the real-time operational data associated with the HVAC system) and the control logic associated with controller 102 (e.g., the logical mapping between the input and output points of the controller). In an embodiment, computing device 108 may also determine the case of the fault based on the additional project information associated with the commissioning of the HVAC system.

As used herein, a fault in the HVAC system can include and/or refer to a component of the HVAC system functioning improperly and/or causing abnormal behavior in the HVAC system and/or facility, and/or to an event that occurs to cause the component to function improperly or cause the abnormal behavior. For example, a fault in the HVAC system can include and/or refer to a component of the HVAC system breaking down, malfunctioning, ceasing to operate correctly, or operating in an unexpected manner. As an additional example, a fault can include and/or refer to abnormal (e.g., anomalous) behavior of the component.

As an example, computing device 108 can determine the cause of a fault occurring in the HVAC system by sequentially determining (e.g., checking) whether each respective output point, and the input points that affect each respective output point, are different from what would be expected. These sequential determinations can be made using the data collected by controller 102 and the control logic associated with controller 102.

For instance, computing device 108 can determine, based on the real-time operational data associated with the HVAC system, whether the value (e.g., the present value) of one of the output points of controller 102 is different from the expected value for that output point (e.g., the value that output point would be expected to be at). Upon determining that the value of that output point is different from its expected value, computing device 108 can determine which of the input points of controller 102 affect that output point based on the control logic associated with the controller, and then determine whether the value of any of these input points is different from their respective expected value based on the real-time operational data associated with the HVAC system. These input points can include input points that directly affect that output point, and input points that indirectly affect that output point, as previously described herein.

Computing device 108 can then determine the cause of the fault occurring in the HVAC system based on whether the value of any of these input points is different from their respective expected value. For instance, upon determining that the value of any of these input points is different from their respective expected value, computing device 108 can determine which input point (or points) has a value different from its respective expected value, and determine the cause of the fault based on this determination.

Upon determining that the value of the first output point is not different from its expected value, computing device 108 can then determine whether the value of another (e.g., a different) one of the output points of controller 102 is different from its expected value. Upon determining that the value of this output point is different from its expected value, computing device 108 can determine which of the input points of controller 102 affect this output point based on the control logic associated with the controller, and then determine whether the value of any of these input points is different from their respective expected value based on the real-time operational data associated with the HVAC system. Computing device 108 can then determine the cause of the fault occurring in the HVAC system based on whether the value of any of these input points is different from their respective expected value, in a manner analogous to that described for the first output point.

If the value of this second output point is not different from its expected value, computing device 108 can continue to repeat this process for each remaining output point, until all its respective output and input points have been checked.

Once the cause of the fault occurring in the HVAC system has been determined, computing device 108 can provide the cause of the fault to a user (e.g., a technician or operator of the HVAC system), and/or can correct (e.g., take action to correct) the cause of the fault. For example, in an embodiment, computing device 108 can display the cause of the fault to the user on a user interface of the computing device. As an additional example, in an embodiment, computing device 108 can send (e.g., transmit) the cause of the fault to a mobile device (e.g., smart phone, tablet, etc.) of the user, and the cause of the fault can be displayed to the user on the user interface of the mobile device. Further, in an embodiment, computing device 108 can determine, and provide in the display along with the cause of the fault, a recommendation on how to correct the cause of the fault in the most optimized (e.g., cheapest and/or quickest) way possible. Examples of such displays will be further described herein (e.g., in connection with FIGS. 3A-3C).

Computing device 108 may then receive input for correcting (e.g., instructions on how to correct) the cause of the fault from the user, and correct the cause of the fault responsive to receiving the input. For instance, computing device 108 may receive the input directly from the user (e.g., the user may enter the input into the user interface of the computing device), or may receive the input from mobile device 110 via network 106 (e.g., the user may enter the input into mobile device 110, which may then transmit the input to computing device 108 via network 106). As an additional example, in an embodiment, computing device 108 may automatically (e.g., without receiving any user input) correct the cause of the fault.

Computing device 108 can correct the cause of the fault by adjusting an input point of controller 102 to the expected value for that input point. For example, computing device 108 can correct the cause of the fault by adjusting the value of the input point (or points) determined to have a value different from their expected value to their respective expected value.

Upon correcting the cause of the fault (e.g., upon adjusting the input point(s) to their expected value), computing device 108 can determine whether the value of the output point of controller 102 affected by the adjusted input point(s) is different from the expected value for that output point (e.g., to confirm that the output point matches its expected value after its input point(s) has been adjusted). If the value of the output point of controller 102 affected by the adjusted input point(s) is different from its expected value, the cause of the fault may not have actually been corrected, and the sequential checking process described above can be repeated.

As an example, an occupant of the facility may report (e.g., to an operator or technician of the HVAC system) that it is too hot on the second floor of the facility. The possible reasons for this fault could include, for instance, a faulty room temperature sensor, the time schedule for the floor being in unoccupied mode, a controller for the floor being in heating mode (e.g., instead of cooling mode), a supply air damper being closed, an AHU not running, an airflow set point not being set correctly, and/or a VAV fan being off, among others.

Based on the physical location (e.g., the second floor) of the occupant reporting the fault (e.g., the floor being too hot), computing device 108 may retrieve the data collected by the controller for the second floor of the facility, the control logic associated with that controller, and the additional project information associated with the commissioning of the HVAC system. Computing device 108 can then determine the reason why the floor is too hot by sequentially checking the input and output points of the controller using this information, as previously described herein.

For instance, the sequential check may indicate that the VAV damper for the second floor is in a closed position when it would be expected to be open, and that the input points that affect this output point (e.g., that affect the position of the VAV damper) are the occupancy mode for the floor, the control mode of the controller for the floor, the position of the supply air damper for the VAV damper of the floor, and the status of the AHU fan for the VAV damper of the floor. The sequential check can then determine whether each of these input points are at their expected values. For instance, if someone accidently left the supply air damper in manual mode, the sequential check can determine that the supply air damper is in manual mode when it would be expected to be in auto mode, and that this is the cause of the floor being too hot. In such an example, computing device 108 can then correct the cause of the fault by setting the supply air damper to auto mode.

Continuing with the example, if the AHU that supplies air to the second floor VAV damper is located on a different floor of the facility, the supply information included in the additional project information may indicate which AHU is supplying the air to the second floor VAV damper, and the facility information included in the additional project information may indicate the physical location of that AHU. The sequential check of the input and output points described above can then be used to determine the cause of the second floor being too hot, even though the root cause of that fault is at a different location in the facility.

In an embodiment, computing device 108 can predict that a fault will occur in the HVAC system based, at least in part, on the data collected by controller 102 (e.g., the real-time operational data associated with the HVAC system), the control logic associated with controller 102 (e.g., the logical mapping between the input and output points of the controller), and/or the additional project information associated with the commissioning of the HVAC system. For example, computing device 108 can predict that the fault will occur by sequentially determining (e.g., checking) whether each respective output point, and the input points that affect each respective output point, are different from what would be expected, in a manner analogous to that used to determine faults in the HVAC system that are currently occurring. Further, computing device 108 can provide a notification of the predicted fault to a user, in a manner analogous to that used to provide a notification of a currently occurring fault, so that the fault may be corrected (e.g., prevented) before it actually occurs.

Figure 2:
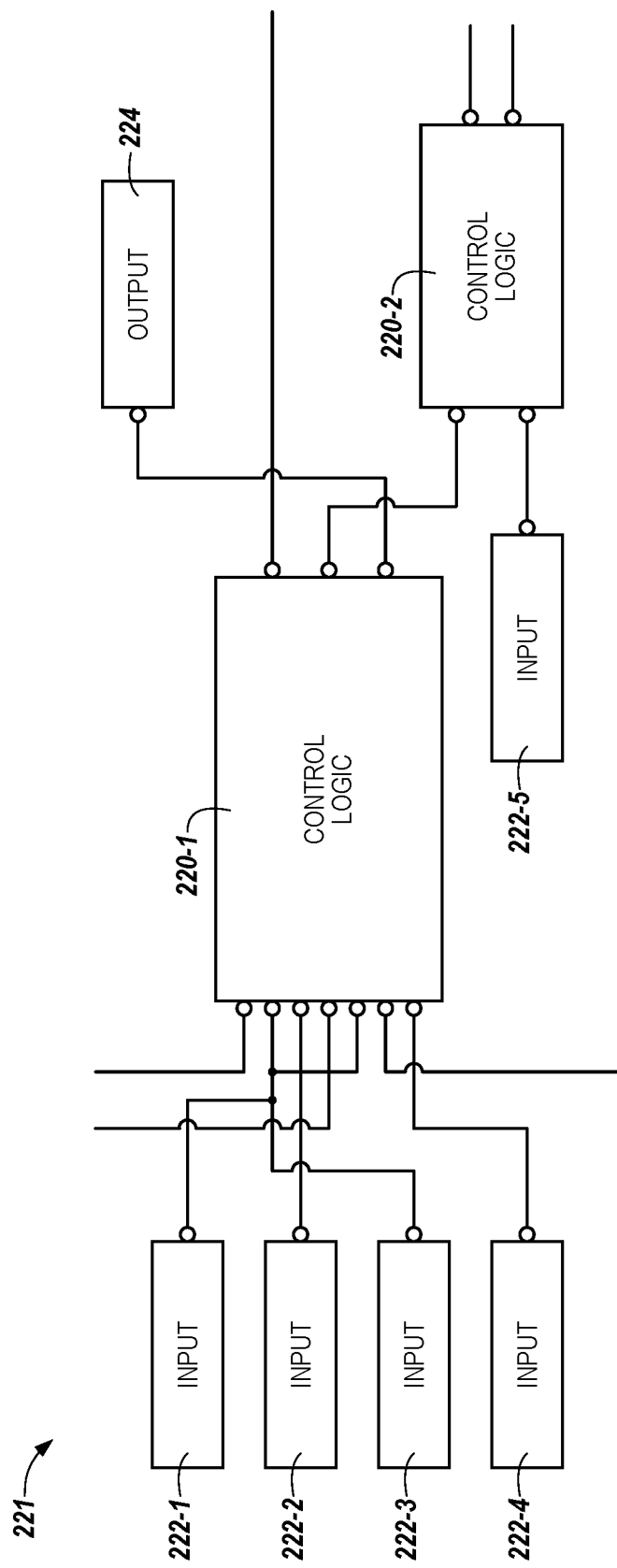
FIG. 2 illustrates an example of a logical mapping between input points and an output point of a controller in accordance with an embodiment of the present disclosure.

FIG. 2 illustrates an example of a logical mapping 221 between input points (e.g., 222-1, 222-2, 222-3, 222-4, and 222-5) and an output point (e.g., 224) of a controller in accordance with an embodiment of the present disclosure. For example, the logical mapping 221 can be included in control logic (e.g., 220-1 and 220-2) associated with the controller. The controller can be, for example, a controller of an HVAC system, such as controller 102 previously described in connection with FIG. 1, and the input points 222 and output point 224 can be analogous to the input points and output points of controller 102 previously described in connection with FIG. 1. Although four input points and one output point are shown in the example illustrated in FIG. 2, embodiments of the present disclosure are not limited to a particular number of input points or output points.

Logical mapping 221 can provide an indication (e.g. identify) which of input point or points 222-1, 222-2, 222-3, 222-4, and 222-5 affect output point 224. For instance, in the example illustrated in FIG. 2, logical mapping 221 may indicate that input points 222-4 and 222-5 affect output point 224, such that an adjustment made to either of input points 222-4 and 222-5 may result in a change to output point 224. In this example, input point 222-4 may directly affect output point 224, and input point 222-5 may indirectly affect output point 224.

Further, control logic 220-1 and 220-2 may be interconnected across other controllers of the HVAC system. For instance, in the example illustrated in FIG. 2, there may be three additional input points and three additional output points (not shown in FIG. 2) that are shared with an additional controller or controllers of the HVAC system. Logical mapping 221 can include the mapping for these shared input and output points, as illustrated in FIG. 2.

FIGS. 3A, 3B, and 3C illustrate example screen shots 332, 334, and 336, respectively, displayed (e.g., to a user) during the process of determining a cause of a fault in an HVAC system in accordance with an embodiment of the present disclosure. The screen shots may be displayed, for example, on a user interface of computing device 108 and/or mobile device 110 previously described in connection with FIG. 1. For instance, the screen shots may be displayed sequentially (e.g., one at a time) during the process of determining the cause of the fault (e.g., screen shot 332 may be displayed first, screen shot 334 may be displayed next after screen shot 332, and screen shot 336 may be displayed last after screen shot 334).

Screen shot 332 illustrated in FIG. 3A provides an indication to the user that an occupant of the facility has reported a fault (e.g., that it is too hot on the second floor of the facility). For instance, screen shot 332 includes (e.g., displays) the reported fault (e.g. issue), the person who has reported the fault (e.g., Tom), and the time and location of the reported fault (e.g., second floor, east wing at 10:00 AM on Jan. 24, 2017), as illustrated in FIG. 3A.

Screen shot 334 illustrated in FIG. 3B provides the cause of the fault to the user. For instance, screen shot 334 includes the determined cause of the fault (e.g., the AHU for that floor is not running), along with a list of other possible causes (e.g., airflow sensor, occupancy mode, and supply air damper) that have been sequentially checked and determined to not be the cause of the fault.

Screen shot 336 illustrated in FIG. 3C provides a recommendation to the user of how to correct the fault. For instance, FIG. 3C includes a recommendation that the fault can be corrected by changing the operational mode of the AHU from manual to auto, and provides an indication to the user of how this can be accomplished (e.g., by relinquishing the indicated icon in the display).

Figure 4:
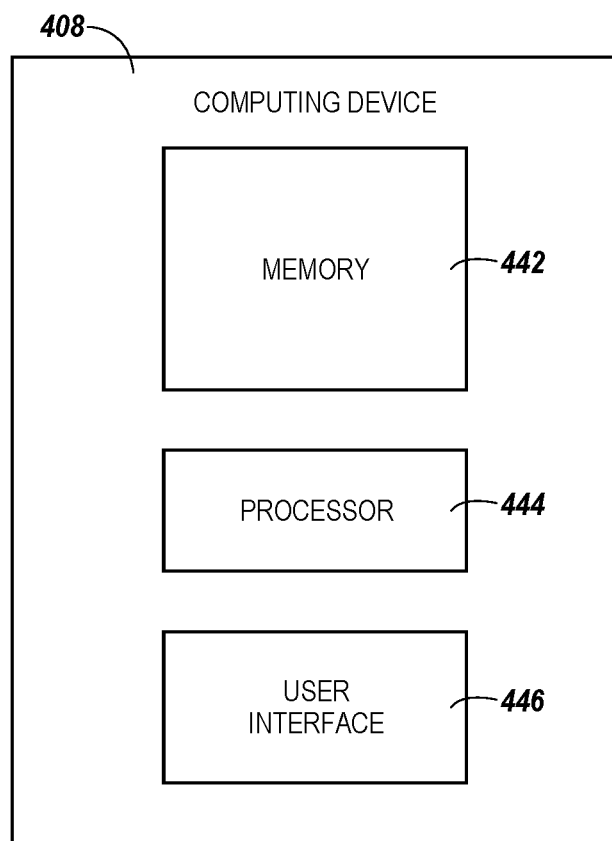
FIG. 4 illustrates an example of a computing device for determining the cause of a fault in an HVAC system in accordance with an embodiment of the present disclosure.

FIG. 4 illustrates an example of a computing device 408 for determining the cause of a fault in an HVAC system in accordance with an embodiment of the present disclosure. Computing device 408 can be, for example, computing device 108 previously described in connection with FIG. 1, and can be a laptop computer, a desktop computer, or a mobile device (e.g., smart phone, tablet, PDA, etc.), for instance. However, embodiments of the present disclosure are not limited to a particular type of computing device.

As shown in FIG. 4, computing device 408 can include a memory 442 and a processor 444. Memory 442 can be any type of storage medium that can be accessed by processor 444 to perform various examples of the present disclosure. For example, memory 442 can be a non-transitory computer readable medium having computer readable instructions (e.g., computer program instructions) stored thereon that are executable by processor 444 to determine the cause of a fault in an HVAC system in accordance with the present disclosure. That is, processor 444 can execute the executable instructions stored in memory 442 to determine the cause of a fault in an HVAC system in accordance with the present disclosure.

Memory 442 can be volatile or nonvolatile memory. Memory 442 can also be removable (e.g., portable) memory, or non-removable (e.g., internal) memory. For example, memory 442 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 442 is illustrated as being located in computing device 408, embodiments of the present disclosure are not so limited. For example, memory 442 can also be located internal to another computing resource (e.g., enabling computer readable instructions to be downloaded over the Internet or another wired or wireless connection).

As shown in FIG. 4, computing device 408 can include a user interface 446. A user (e.g., operator) of computing device 460, such as, for instance, an operator and/or technician of an HVAC system, can interact with computing device 408 via user interface 446. For example, user interface 446 can provide (e.g., display) information to, and receive information from (e.g., input by), the user of computing device 408.

In an embodiment, user interface 446 can be a graphical user interface (GUI) that can include a display (e.g., a screen) that can provide and/or receive information to and/or from the user of computing device 408. The display can be, for instance, a touch-screen (e.g., the GUI can include touch-screen capabilities). As an additional example, user interface 446 can include a keyboard and/or mouse the user can use to input information into computing device 408. Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for determining a cause of a fault in a heating, ventilation, and air conditioning (HVAC) system, comprising:
   a memory; and
   a processor configured to execute executable instructions stored in the memory to:
   receive operational data associated with an HVAC system;
   receive control logic associated with a controller of the HVAC system, the control logic associated with the controller of the HVAC system including a logical mapping between input points of the controller and output points of the controller;
   determine a cause of a fault occurring in the HVAC system based, at least in part, on the operational data associated with the HVAC system and the control logic of the controller of the HVAC system;

provide the cause of the fault occurring in the HVAC system to a user; and correct the cause of the fault occurring in the HVAC system.

2. The computing device of claim 1, wherein the logical mapping between the input points and output points of the controller includes a logical mapping between input points and output points of the controller that are shared with an additional controller of the HVAC system.

3. The computing device of claim 1, wherein the processor is configured to execute the instructions to:

predict a fault will occur in the HVAC system based, at least in part, on the operational data associated with the HVAC system and the control logic of the controller of the HVAC system; and provide a notification of the predicted fault to the user.

4. The computing device of claim 1, wherein the processor is configured to execute the instructions to provide the cause of the fault occurring in the HVAC system to the user by displaying the cause of the fault on a user interface of the computing device.

5. The computing device of claim 1, wherein the processor is configured to execute the instructions to provide the cause of the fault occurring in the HVAC system to the user by transmitting the cause of the fault to a mobile device of the user.

6. A computer implemented method for determining a cause of a fault in a heating, ventilation, and air conditioning (HVAC) system, comprising:

receiving, by a computing device, operational data associated with an HVAC system;

receiving, by the computing device, control logic associated with input points and output points of a controller of the HVAC system, wherein the control logic includes a logical mapping between the input points of the controller and each respective output point of the controller;

determining, by the computing device, a cause of a fault occurring in the HVAC system based, at least in part, on the operational data associated with the HVAC system and the logical mapping between the input points of the controller and each respective output point of the controller; and correcting, by the computing device, the cause of the fault occurring in the HVAC system.

7. The method of claim 6, wherein the logical mapping between the input points of the controller and each respective output point of the controller provides an indication of which of the input points of the controller affect each respective output point of the controller.

8. The method of claim 6, wherein the method includes automatically correcting, by the computing device, the cause of the fault occurring in the HVAC system.

9. The method of claim 6, wherein the method includes:

receiving, by the computing device from a user, input for correcting the cause of the fault occurring in the HVAC system; and correcting, by the computing device, the cause of the fault responsive to receiving the input from the user.

10. The method of claim 6, wherein the method includes:

receiving, by the computing device, the operational data associated with the HVAC system from the controller; and receiving, by the computing device, the control logic associated with the input points and output points of the controller from the controller.

11. The method of claim 6, wherein the method includes receiving, by the computing device, the control logic associated with the input points and output points of the controller from a commissioning device for the HVAC system.

12. The method of claim 6, wherein:

the input points of the controller include an input point that is shared with an additional controller of the HVAC system; and the output points of the controller include an output point that is shared with an additional controller of the HVAC system.

13. The method of claim 6, wherein correcting the cause of the fault occurring in the HVAC system includes adjusting a value of one of the input points of the controller to an expected value for that input point.

14. A non-transitory computer readable medium having computer readable instructions stored thereon that are executable by a processor to:

receive operational data associated with an HVAC system;

receive control logic including a mapping between input points and output points of a controller of the HVAC system;

determine, based on the operational data associated with the HVAC system, whether a value of one of the output points of the controller is different from an expected value for that output point;

determine, upon determining that the value of that output point of the controller is different from the expected value, which of the input points of the controller affect that output point based on the control logic associated with the input points and output points of the controller;

determine, based on the operational data associated with the HVAC system, whether a value of any of the input points of the controller determined to affect that output point of the controller are different from an expected value for that input point;

determine, based on whether the value of any of the input points of the controller is different from the expected value for that input point, a cause of a fault occurring in the HVAC system; and correct the cause of the fault occurring in the HVAC system.

15. The non-transitory computer readable medium of claim 14, wherein the instructions are executable by the processor to:

determine, upon determining that the value of any of the input points of the controller determined to affect that output point of the controller are different from the expected value for that input point, which of the input points determined to affect that output point have a value different from their expected value; and determine, based on which of the input points are determined to have a value different from their expected value, the cause of the fault occurring in the HVAC system.

16. The non-transitory computer readable medium of claim 15, wherein the instructions are executable by the processor to adjust, upon determining the cause of the fault occurring in the HVAC system, the value of the input points determined to have a value different from their expected value to their expected value.

17. The non-transitory computer readable medium of claim 14, wherein the instructions are executable by the processor to:

determine, upon determining that the value of that output point of the controller is not different from the expected value, whether a value of another one of the output points of the controller is different from an expected value for that output point;

determine, upon determining that the value of that output point of the controller is different from the expected value, which of the input points of the controller affect that output point based on the control logic associated with the input points and output points of the controller;

determine, based on the operational data associated with the HVAC system, whether a value of any of the input points of the controller determined to affect that output point of the controller are different from an expected value for that input point; and determine, based on whether the value of any of the input points of the controller is different from the expected value for that input point, a cause of a fault occurring in the HVAC system.

18. The non-transitory computer readable medium of claim 14, wherein the instructions are executable by the processor to:

determine, upon correcting the cause of the fault, whether the value of that output point of the controller is different from the expected value for that output point.

19. The non-transitory computer readable medium of claim 14, wherein the input points of the controller determined to affect that output point of the controller include:

an input point that directly affects that output point; and
an input point that indirectly affects that output point.

* * * * *